(12) United States Patent
Enami et al.

(10) Patent No.: US 6,506,495 B1
(45) Date of Patent: Jan. 14, 2003

(54) COMPLEX SKIN, SLUSH MOLDING THERMOPLASTIC ELASTOMER COMPOSITION FOR USE IN THE SKIN, AND AN ARTICLE INCLUDING THE SKIN

(75) Inventors: Hirohide Enami, Akashi (JP); Kenrou Ono, Hyogo (JP); Kenji Kubomoto, Hyogo (JP); Takahide Okazawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/290,796

(22) Filed: Apr. 13, 1999

(30) Foreign Application Priority Data

Apr. 13, 1998 (JP) .............................. 10-100787
Apr. 14, 1998 (JP) .............................. 10-102402
Jul. 31, 1998 (JP) .............................. 10-216632

(51) Int. Cl.[7] ........................ B32B 27/00; B32B 7/04; B32B 27/08; C08L 53/00; C08L 23/00
(52) U.S. Cl. ................... 428/424.8; 428/420; 428/516; 525/89; 525/98; 525/240; 525/241
(58) Field of Search ................... 525/89, 98, 99, 525/240, 241; 428/515, 516, 420, 424.2, 424.8

(56) References Cited

U.S. PATENT DOCUMENTS

| | | | | |
|---|---|---|---|---|
| 4,937,030 A | * | 6/1990 | Nishiyama et al. | 264/162 |
| 5,108,844 A | * | 4/1992 | Blemburg et al. | 428/518 |
| 5,354,618 A | * | 10/1994 | Ishigaki et al. | 428/424.8 |
| 5,948,850 A | * | 9/1999 | Enami et al. | 524/515 |
| 6,011,102 A | * | 1/2000 | Shimojo et al. | 524/451 |
| 6,071,619 A | * | 6/2000 | DeWinter | 428/423.1 |
| 6,127,021 A | * | 10/2000 | Kelman | 428/172 |

* cited by examiner

Primary Examiner—Paul Thibodeau
Assistant Examiner—Kevin R. Kruer
(74) Attorney, Agent, or Firm—Wood, Phillips, Katz, Clark & Mortimer

(57) ABSTRACT

A multilayer skin comprising an outer layer prepared by slush molding powder of a thermoplastic elastomer composition having a polypropylene resin, a hydrogenated styrene-butadiene random copolymer rubber, a process oil, an elastomer with high oil absorption capability, and a release agent. An inner layer is bonded to the outer layer, is prepared by slush molding, and is a blend of an elastomer with high oil absorption capability, an olefinic polymer with active hydrogen, and a catalyst which promotes isocyanate reaction. There is also a multilayer skin with a different composition as well as an article made with a multilayer skin having the compositions. There is further a thermoplastic elastomer composition for a layer of a multilayer skin.

33 Claims, 2 Drawing Sheets

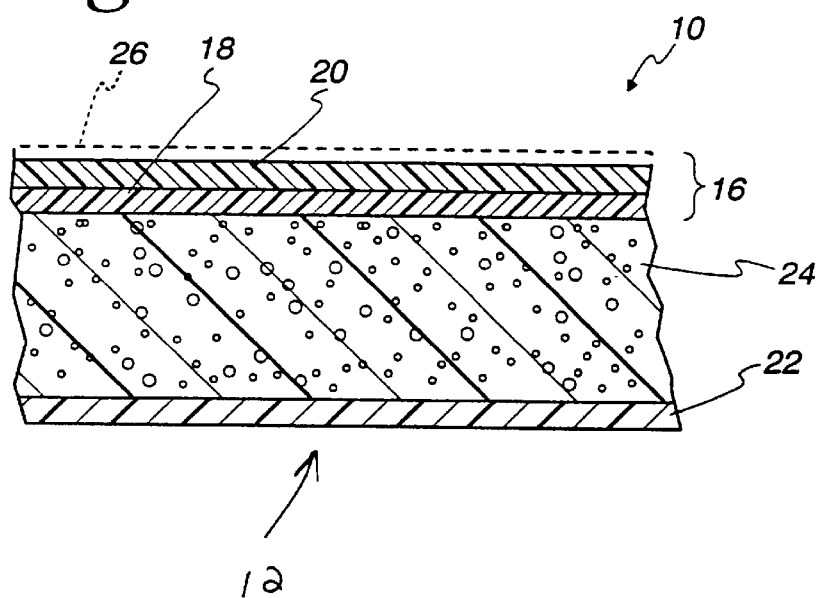
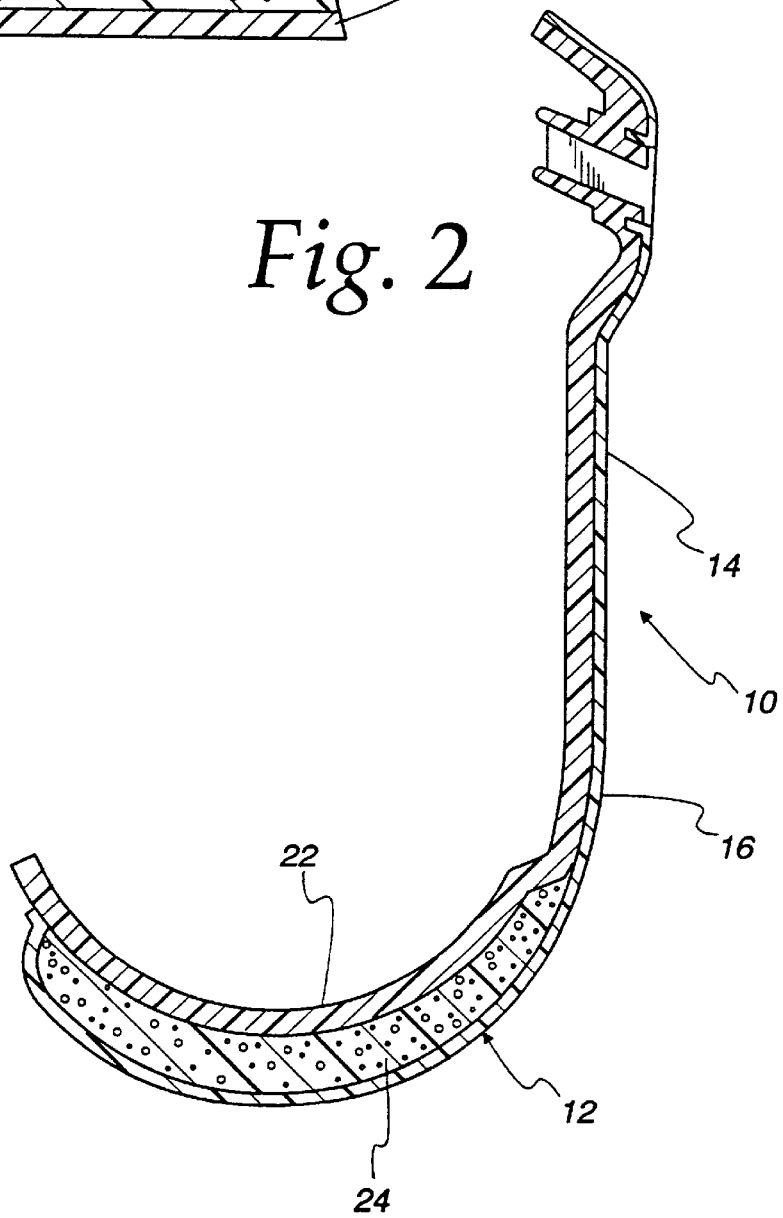

COMPLEX SKIN, SLUSH MOLDING THERMOPLASTIC ELASTOMER COMPOSITION FOR USE IN THE SKIN, AND AN ARTICLE INCLUDING THE SKIN

BACKGROUND OF THE INVENTION

1. Field of the Invention

This invention relates to a complex skin of the type used for exposed decorative surfaces and, more particularly, to a skin made by slush molding a thermoplastic elastomer composition. The invention is also directed to an article which incorporates the complex skin.

2. Background Art

It is known to perform a powder slush molding process using a soft vinyl chloride resin powder to produce a wide range of skins, as for articles in automobile interiors, such as instrument panels, console boxes, door trims, etc. This process allows a skin to be formed which is soft to the touch and which can be crimped and stitched. The process further allows a high degree of design freedom.

Unlike other molding processes, such as injection molding and compression molding, the powder slush molding process does not produce a particular shape under pressure. The powder fluidity may not be sufficient to cause uniform adherence to a mold with a complex shape. Preferably, the powder material should have a sufficiently low melt viscosity to form a film when the powder adhering to a mold is melted without the application of pressure.

It is also desirable that the molded skin be readily releasable from a mold by cooling the mold.

In Jp-A7-82433, it is proposed to use a ground mixture of polypropylene resin and a specific styrene-series thermoplastic elastomer at a weight ratio of 70/30 to 30/70. The styrene-series thermoplastic elastomer is selected from a styrene/ethylene-butylene/styrene block copolymer with a styrene content equal to or less than 20% by weight, a styrene/ethylene-propylene/styrene block copolymer with a styrene content equal to or less than 20% by weight, and a hydrogenated styrene-butadiene random copolymer rubber-with a styrene content equal to or less than 20% by weight. The styrene-series thermoplastic elastomer is readily miscible with the polypropylene resin. The resulting composition is described to be suitable for powder molding.

The composition is suitable for forming a skin material because hydrogenated styrene-butadiene random copolymer rubber can be finely dispersed in the polypropylene resin when the polypropylene resin is mixed with the hydrogenated styrene-butadiene random copolymer rubber. Less deterioration of the physico-chemical properties results. However, when this composition is used as the inner layer of a complex skin having an outer and inner layer, oligomer components, a process oil, a stabilizer, and a catalyst in the composition tend to bleed to the surface of the skin to make the resulting skin viscous. This is because the hydrogenated styrene-butadiene random co-polymer rubber has poor oil absorption capability.

If a transparent coating film is formed and thermally applied on the surface of the outer layer of the complex skin so as to effect reinforcement thereof, the process oil, stabilizer, and catalyst in the inner layer, in addition to the oligomer components therein, bleed to the surface over time, eventually deteriorating the adhesion of the complex skin to an underlying urethane foam. Because the powder of the thermoplastic elastomer composition defining the inner layer is below ambient temperature during the slush molding process, the oligomer components, the process oil, the stabilizer, and the catalyst in the composition bleed to the surface of the powder, which turns the powder to a viscous state. The composition may cause blocking over time as a result of which the powder fluidity deteriorates. Releasability of the skin from a mold may likewise be deteriorated. The skin may be deformed upon being released from the mold.

Generally, the skins prepared using conventional thermoplastic elastomer compositions have not both satisfactorily adhered to a mold and permitted release from the mold. Conventionally, thermoplastic elastomer compositions have been modified to improve releasability, while primers or adhesives have been coated on a mold so as to enhance the adhesion. However, the skin, after such adhesive treatment, tends to remain viscous at the treated area thereof, so that the resulting skin cannot be stacked, as for storage. Thus, a considerable amount of space may be required to store such skins.

SUMMARY OF THE INVENTION

The invention is directed to a multilayer skin having an outer layer and an inner layer. The outer layer is prepared by slush molding powder of a thermoplastic elastomer composition having a polypropylene resin, a hydrogenated styrene-butadiene random copolymer rubber, a process oil, an elastomer with high oil absorption capability, and a release agent. The inner layer is bonded to the outer layer, is prepared by slush molding, and is a blend of an elastomer with high oil absorption capability, an olefinic polymer with active hydrogen, and a catalyst which promotes isocyanate reaction.

The invention is also directed to a multilayer skin having an inner layer and an outer layer. The outer layer is prepared by slush molding the powder of a thermoplastic elastomer composition including at least a polypropylene resin, a hydrogenated styrene-butadiene random copolymer rubber, a process oil, an elastomer with high oil absorption capability, and a release agent. The inner layer is prepared by slush molding first and second powders. The first powder is made from a thermoplastic elastomer composition including a polypropylene resin, a hydrogenated styrene-butadiene random copolymer rubber, a process oil, and an elastomer with high oil absorption capability. The second powder includes an elastomer with high oil absorption capability, an olefinic polymer with active hydrogen, and a catalyst promoting isocyanate reaction.

The invention is also directed to an article including a core layer made of synthetic resin, a multilayer skin having an inner layer and an outer layer bounded to the inner layer, and a foam layer between the core layer and the multilayer skin. The foam layer is bonded to the multilayer skin and to the core layer. The outer layer of the multilayer skin is prepared by slush molding the powder of a thermoplastic elastomer composition that is made from a polypropylene resin, a hydrogenated styrene-butadiene random copolymer rubber, a process oil, an elastomer with high oil absorption capability, and a release agent. The inner layer of the multilayer skin is made from an elastomer with high oil absorption capability, an olefinic polymer with active hydrogen, and a catalyst which promotes isocyanate reaction.

The invention is also directed to an article having a core layer made from a synthetic resin, a multilayer skin having an inner layer and an outer layer bonded to the inner layer, and a foam layer between the core layer and the multilayer skin. The foam layer is bonded to the multilayer skin and the core layer. The outer layer of the multilayer skin is prepared by slush molding powder of a thermoplastic elastomer composition made from a polypropylene resin, a hydrogenated styrene-butadiene random copolymer, rubber, a process oil, an elastomer with high oil absorption capability, and a release agent. The inner layer is prepared by slush molding first and second powders. The first powder is a thermoplastic elastomer composition including a polypropylene resin, a hydrogenated styrene-butadiene random copolymer rubber, a process oil, and an elastomer with high oil absorption capability. The second powder is an elastomer with high oil absorption capability, an olefinic polymer with active hydrogen, and a catalyst promoting isocyanate reaction.

The invention is also directed to a multilayer skin having inner and outer layers each prepared by slush molding powder. The powder in the outer layer is a thermoplastic composition including a polypropylene resin, a hydrogenated styrene-butadiene random copolymer rubber, a process oil, an elastomer with high oil absorption capability, and a release agent. The inner layer includes a polypropylene resin, a hydrogenated styrene-butadiene random copolymer rubber, a process oil, an elastomer with high oil absorption capability, an olefinic polymer with active hydrogen, and a catalyst providing isocyanate reaction.

The invention is further directed to a multilayer skin having inner and outer layers each prepared by slush molding powder. The powder in the outer layer is a thermoplastic composition including a polypropylene resin, a hydrogenated styrene-butadiene random copolymer rubber, a process oil, an elastomer with high oil absorption capability, and a release agent. The inner layer is prepared by slush molding first and second powders. The first powder is a thermoplastic elastomer composition including a polypropylene resin, a hydrogenated styrene-butadiene random copolymer rubber, a process oil, and an elastomer with high oil absorption capability. The second powder is a thermoplastic composition including a polypropylene resin, a hydrogenated styrene-butadiene random copolymer rubber, a process oil, an elastomer with high oil absorption capability, an olefinic polymer with active hydrogen, and a catalyst promoting isocyanate reaction.

The invention is also directed to an article having a core layer made from a synthetic resin, a multilayer skin having an inner layer and an outer layer each prepared by slush molding powder, and a foam layer between the core layer and the multilayer skin. The foam layer is bonded to the multilayer skin and to the core layer. The outer layer is prepared by slush molding powder made from a thermoplastic elastomer composition including a polypropylene resin, a hydrogenated styrene-butadiene random copolymer rubber, a process oil, an elastomer with high oil absorption capability, and a release agent. The inner layer is prepared by slush molding powder made from a polypropylene resin, a hydrogenated styrene-butadiene random copolymer rubber, a process oil, an elastomer with high oil absorption capability, an olefinic polymer with active hydrogen, and a catalyst promoting isocyanate reaction.

The inner layer may further include a release agent.

The foam layer may be polyurethane foam.

The core layer may be an olefinic resin.

In one form, the outer layer has a surface and a coating film is formed on the surface of the outer layer.

The elastomer with high oil absorption capability in one, or both, of the inner and outer layers may be an ethylene-octene copolymer.

The ratio of the first powder to the second powder may be 1:5 to 5:1.

The invention is further directed to a thermoplastic elasto for use in forming, by slush molding, an inner layer of a multilayer skin having an inner layer and an outer layer. The thermoplastic elastomer composition is made from a polypropylene resin, a hydrogenated styrene-butadiene random copolymer rubber, a process oil, an elastomer with high oil absorption capability, an olefinic polymer with active hydrogen, a catalyst promoting isocyanate reaction, and a release agent.

The elastomer with high oil absorption capability may be an ethylene-octene copolymer with a long-chain branched structure.

BRIEF DESCRIPTION OF THE DRAWINGS

FIG. 2 is an enlarged, cross-sectional view of the automobile instrument panel taken along line 2—2 of FIG. 1; and FIG. 3 is an enlarged, cross-sectional view of a padded part of the automobile instrument panel in FIGS. 1 and 2.

DETAILED DESCRIPTION OF THE DRAWINGS

Figure 1:
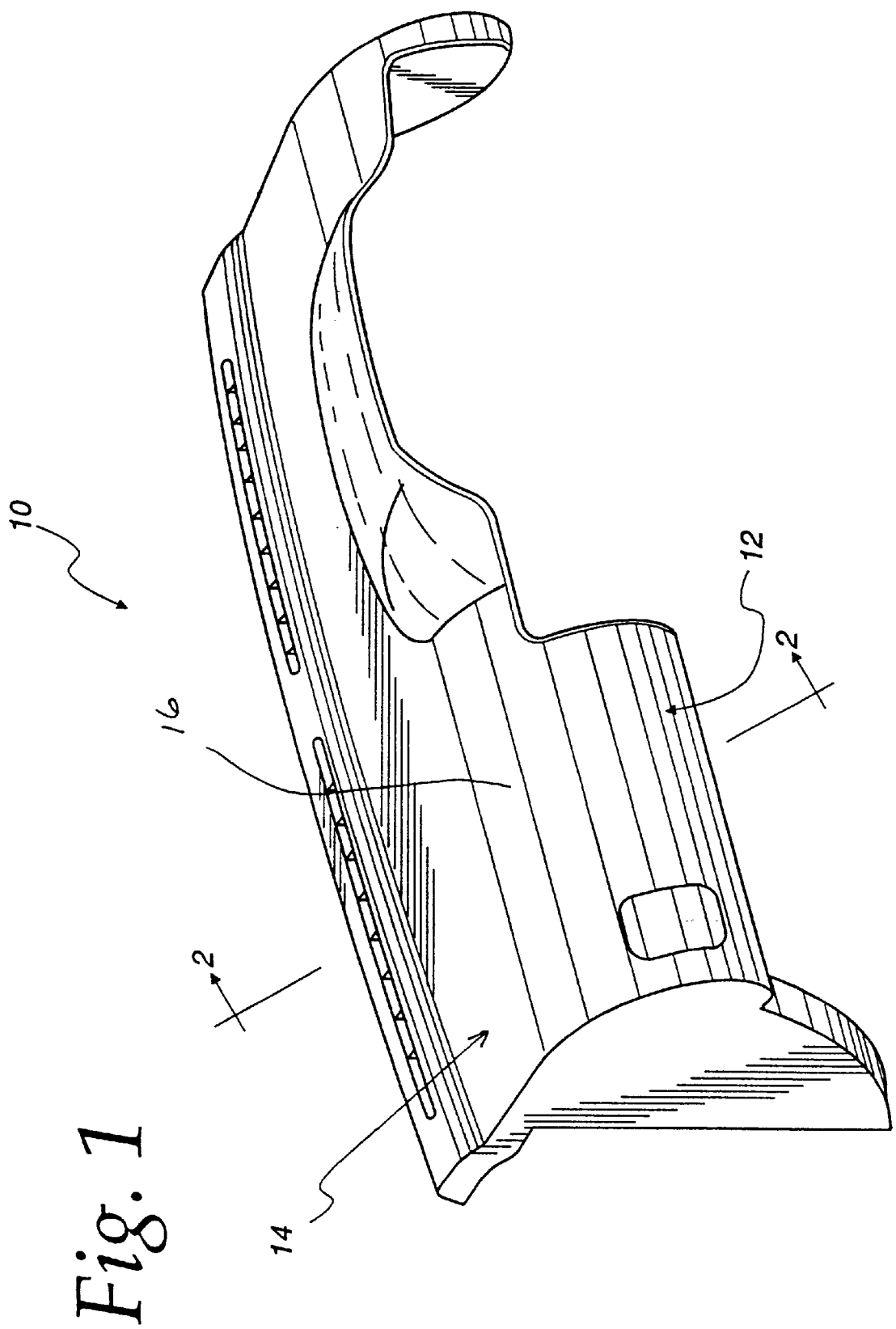
FIG. 1 is a perspective view of an automobile instrument panel with a complex skin, according to the present invention, incorporated therein.

An instrument panel, according to the invention, is shown at 10 in the Figures herein and consists of a soft, padded part 12 and a hard part 14. The surface of the soft part 12 is defined by a crimp-patterned complex/multilayer skin 16 made up of an inner layer 18 and an outer layer 20. A core layer 22 underlies the complex skin 16 and is made from a synthetic resin. A foam layer 24, such as polyurethane foam, resides between, and is bonded to, the core layer 22 and the complex skin 16 at the soft part 12. At the hard part 14, the complex skin 16 is adhered directly to the core layer 22.

The outer layer 20 is prepared by slush molding a powder of a thermoplastic elastomer composition including at least a polypropylene resin, a hydrogenated styrene-butadiene random copolymer rubber, a process oil, an elastomer with high oil absorption capability, and a release agent.

The inner layer 18 is prepared by slush molding powder of a thermoplastic elastomer composition including at least an elastomer with high oil absorption capability, an olefinic polymer with active hydrogen, and a catalyst which promotes isocyanate reaction. Alternatively, the inner layer 18 may be formed by slush molding powder of a thermoplastic elastomer composition including at least a polypropylene resin, a hydrogenated styrene-butadiene random copolymer rubber, a process oil, an elastomer with high oil absorption capability, an olefinic polymer with active hydrogen, and a catalyst promoting isocyanate reaction. An inner release agent may be added to the latter thermoplastic elastomer composition.

Because the outer layer 20 contains a release agent, releasability of the outer layer 20 from a mold may be enhanced. The inner adhesion of the inner layer 18 to the core layer 22 and the foam layer 24 can be improved by an agent which enhances adhesion together with the thermoplastic with the elastomer.

An optional coating film 26 can be formed on the outer surface of the outer layer 20. The coating film 26 may be a urethane or an acrylic urethane and reinforces the surface of the outer layer 20 to prevent damage thereto. Preferably, a surface treating agent is used on the outer layer 20 to enhance adherence of the coating layer 26 to the surface of the outer layer 20.

Any polypropylene resin, including polypropylene homopolymer and a block or random copolymer of polypropylene with α-olefin may be used either in the outer layer 20 alone or in both the outer layer 20 and the inner layer 18. A block or random copolymer with ethylene as the α-olefin is preferred in terms of the resulting flexibility in the molded product. In a powder slush molding operation with no pressure application, the polypropylene resin should have a melt fluidity rate (MFR) of 20 g/10 min. or higher as measured at 230° C. under a load of 2.16 kgf according to JIS K7210.

The polypropylene resin described above is a polymer in which the primary chain is broken due to heat or oxidation. The resin has different properties from those of polyethylene that is cross-linked and thereby thermoset. The primary chain is broken with an organic peroxide, which causes a decrease in the molecular weight.

The hydrogenated styrene-butadiene random copolymer rubber (H-SBR) can be used in only the outer layer 20 or in both the outer layer 20 and inner layer 18 and has good miscibility with the polypropylene resin. When kneaded with the polypropylene resin, the copolymer rubber becomes more flexible so that a thermoplastic elastomer composition can be developed which is bendable and little whitened. The styrene content of the hydrogenated styrene-butadiene random copolymer rubber is preferably equal to or less than 30% by weight. The styrene content is approximately 5–15% by weight so as to produce a skin with enhanced flexibility.

H-SBR is different from styrene/ethylene-butylene/styrene (SEBS) as a block copolymer in that a styrene-butadiene rubber with styrene and butadiene randomly copolymerized therein is hydrogenated. Representative products include those of the Dynaron series manufactured by JSR Co., Ltd.

The ratio of polypropylene resin and H-SBR to be mixed together is from 80/20 to 20/80 by weight. When the polypropylene resin exceeds this ratio, the resulting molded skin becomes rigid. When the resin is below this ratio, the tensile strength is reduced.

A process oil, which may be added to the outer layer 20 alone or to both the outer layer 20 and inner layer 18, can be absorbed into the elastomer component in the composition. This tends to decrease the melt viscosity and additionally reduces the hardness of the skin, which enhances flexibility. The process oil is for rubber use and is identified as paraffin series, naphthene series, and aroma series oil. Preferably, the process oil from the paraffin series is used because of the miscibility with the elastomer component. The process oil is added preferably in an amount of 5 to 200 parts by weight per 100 parts by weight of the elastomer having the high oil absorption capability. If the process oil is added above 200 parts by weight, the tensile properties are deteriorated. If the process oil is below 5 parts by weight, the melt viscosity may not be reduced, which may result in a rigid skin.

The elastomer with high oil absorption capability, which is used in both the outer layer 20 and inner layer 18, is miscible with the polypropylene resin and tends to absorb the process oil and the oligomer components in the composition. The elastomer may be, for example, styrene-series block copolymerized thermoplastic elastomers, such as styrene/ethylene-butylene/styrene block copolymer (SEBS) and styrene/ethylene-propylene/styrene block copolymer (SEPS), olefin crystal/ethylene-butylene/olefin crystal block copolymer (CEBC), ethylene-propylene rubber (EPR), and ethylene-octene copolymer (POE).

The POE is a polymer prepared by using a single-site catalyst made up mainly of metallocene compounds, and having one reactive site within the molecule, which can generate homogenous active species. Typically, the POE has a long-chain branched structure with a narrow range of the molecular distribution and with a uniform composition distribution and a lower content of low molecular oligomers or wax. Compared with ethylene-propylene-non-conjugated diene copolymer (EPDM), the POE has sufficiently high fluidity and dispersibility when blended with the polypropylene resin that the POE is readily dispersible finely in the polypropylene resin. Thus the POE is a material suitable for slush molding. Additionally, the POE is different in molecular structure from general linear polymers prepared by using the Ziegler-Natta catalyst, for example, common ethylene-propylene rubber prepared by copolymerizing together ethylene and propylene.

The SEBS described above is prepared by hydrogenating the styrene-butadiene/styrene block copolymer (SBS), including for example Crayton G series products manufactured by Shell Chemical Co., Ltd. and Toughtech H series products manufactured by Asahi Chemicals Ind., Co., Ltd. SEBS at a higher styrene content can acquire a higher strength, but then has reduced flexibility. From this SEBS, it may be difficult to prepare a smooth sheet-like molded article because the styrene hard segment in the SEBS becomes cohesive when the SEBS melts during slush molding. Thus, the styrene content is preferably maintained below 40% by weight.

SEPS is prepared by hydrogenating a styrene/isoprene/styrene block copolymer. The SEPS may be, for example, SEPTON, a product manufactured by Kuraray, Co., Ltd. Like SEBS, the flexibility of SEPS is reduced as the styrene content is increased. The styrene content is preferably below 40% by weight.

Compared with H-SBR, the elastomer with high oil absorption capability is immiscible with the polypropylene resin. When kneaded with and added to the polypropylene resin, the elastomer is dispersed at a dimension in $\mu$m units therein, which is likely to cause the diminishing of tensile properties. When H-SBR and the process oil are added to the polypropylene resin, the oligomer components in the composition may bleed to the surface because of the poor oil absorption capability of H-SBR, so that the surface becomes viscous. The elastomer powder pulverized for powder slush molding by using the resulting mixture may also become viscous as a result of which blocking occurs, resulting in the deterioration of the fluidity of the powder and poor releasability of the resulting skin from a mold. When the elastomer with high oil absorption capability is added to the resin, the elastomer absorbs the oligomer components in the composition and the oil so that the elastomer can block the bleeding thereof to the surface.

The elastomer with high oil absorption capability is added at 20 to 250 parts by weight per 100 parts by weight of H-SBR. If the elastomer is added below 20 parts by weight, the elastomer may not sufficiently absorb the oligomer components in the composition or the oil. When the elastomer is above 250 parts by weight, the elastomer may ineffectively disperse in the polypropylene resin, which may deteriorate tensile properties.

The inner release agent that is used in either the outer layer 20 alone, or in both the outer layer 20 and inner layer 18, may include silicone oil such as dimethylsiloxane, methylhydrokxypolysiloxane, methylphenylpolysiloxane, higher fatty acids, higher fatty acid amides, and higher fatty acid salts. The release agent is preferably added to the outer layer 20 in an amount of from 0.1 to 5.0% by weight. Below 0.1% by weight, the release agent may not adequately improve releasability from the mold. Above 5.0% by weight, adhesion to the inner layer 18 may be adversely affected.

The release agent is added to the inner layer 18 preferably in an amount of from 0.1 to 1.0% by weight. Below 0.1% by weight the release agent may not sufficiently block bleeding of the oligomer components in the composition, the process oil, the stabilizer, and the catalyst to the surface. Above 5.0% by weight, the adhesion to the foam layer 24 may not be adequate.

The olefinic polymer with active hydrogen for the inner layer 18 may include an acid-modified polypropylene resin, a hydroxyl group-containing polypropylene resin, a hydrolysate of ethylene/vinyl acetate copolymer, polybutadiene with a terminal carboxyl group, polybutadiene with a terminal hydroxyl group, a hydrogenated product of polybutadiene with a terminal carboxyl group, a hydrogenated product of polybutadiene with a terminal hydroxyl group, an acid-modified styrene/ethylene-butylene/styrene block copolymer, ethylene methacrylate copolymer and ethylene acrylate copolymer. In the example herein, an OH-modified polyolefin is used.

The polymer is preferably added in an amount of from 2 to 20% by weight. Below 2% by weight, the polymer may not effectively improve adhesive properties. Above 20% by weight, the tensile strength may be undesirably diminished.

The catalyst promoting isocyanate reaction in the inner layer 18 may include organic tin compounds such as dibutyltin dilaurate and dibutyltin distearate, tertiary amine compounds such as tetraalkylethylenediamine and N,N'-dialkylbenzylamine, fatty acid salts such as cobalt naphthenate and zinc stearate, and carboxylate salts of alkali metals.

This catalyst is added in an amount of from 0.01 to 2 parts by weight per 100 parts by weight of the thermoplastic elastomer composition made up of the polypropylene resin, the hydrogenated styrene-butadiene random copolymer rubber, the elastomer with high oil absorption capability, and the olefinic polymer with active hydrogen. Below 0.01 parts by weight, the adhesion of the inner layer 18 to the foam layer 24 may be inadequate. Above 2 parts by weight, detrimental surface bleeding may result.

General thermal stabilizers for use in polyolefin can be used in the outer layer 20 and the inner layer 18. A combination of phenolic antioxidants with phosphorus-series antioxidants can be used. Radical scavengers of hindered amine and benzotriazole-series may be used as a photo-stabilizer.

General organic or inorganic pigments suitable for olefinic-series may be used. Lubricants such as metal salts of fatty acids and fillers such as calcium carbonate and talc may be added, if necessary.

According to the invention, an organic peroxide is added to a blend of the polypropylene resin, the process oil, the elastomer with high oil absorption capability, and the inner release agent or to a blend of the polypropylene resin, the olefinic polymer with active hydrogen, the elastomer with high oil absorption capability, and the process oil. The resulting mixture is kneaded together while being heated. The organic peroxide breaks the primary chain of the polypropylene resin so that the resulting polypropylene resin has a lower molecular weight, increasing the melt fluidity.

The organic peroxide increases melt fluidity of the resulting thermoplastic elastomer composition. The organic peroxide is not used as a cross-linking agent. The thermoplastic elastomer composition prepared by the kneading process during heating never contains any substantial amount of organic peroxide since the organic peroxide becomes thermally decomposed.

The organic peroxide includes those for general use in cross-linking rubbers and resins, such as diacyl peroxide, peroxy ester, diallyl peroxide, di-t-butyl peroxide, t-butyl cumyl peroxide, dicumyl peroxide, 2.5-dimethyl-2.5-di(t-butylperoxy)-hexane-3, 1.3-bis-(t-butylperoxy-isopropyl) benzene, and 1.1-di-butylperoxy-3,3,5-trimethylsiloxane. The organic peroxide preferably has a half life of one minute due to thermal decomposition at 150 to 250° C.

During the kneading process, which occurs while heating at 150–250° C., the organic peroxide breaks the primary chain of the polypropylene resin to reduce the molecular weight thereof to improve the melt fluidity of the thermoplastic elastomer composition. The organic peroxide is added in an amount of from 0.02 to 5.0% by weight to the thermoplastic elastomer composition. Below 0.02%, the ability of the mixture to break the primary chain of the polypropylene resin through decomposition may be sufficiently low that the organic peroxide cannot effectively increase the melt fluidity of the thermoplastic elastomer composition. Above 5% by weight, the decomposition may become excessive, so that the resulting powder molded article may have some poor mechanical properties, including poor tensile strength.

The blends are mixed by: dry blending a given mixture by using a V-type blender, a tumbler, or a Henschel mixer; supplying the resulting blended mixture from a raw material feed hopper while pouring the process oil from a vent opening; and melt kneading the resulting mixture by using a twin extruder at a temperature of 120–250° C. to effect pelletizing of the mixture. The mixture can be kneaded in a two-dividend manner.

By adding the process oil to the elastomer component H-SBR and the elastomer with high oil absorption capability and kneading together the mixture using a seal type kneader and a Banbury mixer, the mixture is pelletized. Thereafter, the organic peroxide and the other blending agents are mixed with the pellet and the polypropylene resin. By using a single or twin extruder, at a temperature within a range of 120–250° C., the mixture can be pelletized.

The melt flow rate (MFR), indicating the melt viscosity of the resulting pellet, is preferably 50 g/10 min. or more at 250° C. under a load of 0.325 kgf according to JIS K7210. Below that value, the melt fluidity of the composition is reduced so that the formation of pin holes is likely to occur in the skin.

The pellet prepared from the blend is finely ground by using an impact-type micro grinder such as a turbo mill, pin mill or hammer mill. The pellet may be ground while being frozen using liquid nitrogen. Depending upon the blend, the melt resin can be sprayed and cooled by means of a spray or a disc atomizer to effect pulverization of the resin.

Ground matter, which can pass through a sieve of 1000 $\mu$m and is of a mean particle size of 100 to 800 $\mu$m, are collected. To this is added and mixed an organic or inorganic agent modifying the powder property. The resulting mixture is used for powder slush molding.

The mixed blends for use in the inner layer 18 are as follows: a mixed powder including a first powder that is a thermoplastic elastomer composition containing at least the polypropylene resin, H-SBR, the process oil and the elastomer with high oil absorption capability, and a second powder that is a thermoplastic elastomer composition for adhesion and containing at least the elastomer with high oil absorption capability, the olefinic polymer with an active hydrogen, and the catalyst promoting isocyanate reaction.

The thermoplastic elastomer compositions are pulverized, as described above. The weight ratio of the first powder and the second powder is from 1:5 to 5:1. When the second powder is less than in this range, it may result in insufficient adhesion. When the amount of powder is greater, the tensile strength of the resulting skin may be undesirably lowered.

The mixed blends for use in the inner layer 18 are a mixture of a first powder of a thermoplastic elastomer composition containing at least the polypropylene resin, H-SBR, the process oil, the elastomer with high oil absorption capability, and the inner release agent, and a second powder that is a thermoplastic elastomer composition for adhesion containing at least polypropylene resin, H-SBR, the process oil, the elastomer with high oil absorption capability, the olefinic polymer with active hydrogen, and the catalyst promoting isocyanate reaction. The thermoplastic elastomer compositions are pulverized, as described above. The weight ratio of the first powder and the second powder in mixture is from 1:5 to 5:1. When the second powder is present in a lesser amount, sufficient adhesion may not be realized. When the second powder is present in a greater amount than the stated range, the tensile strength of the resulting skin may be undesirably lowered.

An inner release agent can be added to the powder of the thermoplastic elastomer composition for adhesion.

The powders of the elastomer compositions described above are used for slush molding. The powders are moved gravitationally onto a mold heated above the melting point of the compositions for the outer layer 20. By inverting the mold after a predetermined time period, the excess composition can be collected in a recovery box. The compositions adhere in layers to the surface of the mold and melt over time to form an outer layer with a thickness of 0.3 to 1.0 mm.

The compositions for use in the inner layer 18 are gravitationally directed against the formed outer layer 20. The mold can then be inverted after a predetermined time period whereupon excess of the compositions is collected in a recovery box. The inner layer 18 melts over time to form a layer with a thickness 0.1 to 0.5 mm. By cooling the mold, the resulting complex skin 16 can be released from the mold and the above procedures thereafter repeated.

The mold can be heated by placing the mold into an oil-circulation or hot-air furnace. The temperature of the mold can be controlled in the oil-circulation furnace through pipes which effect heating only through the mold surface. By using a hot-air furnace, the mold can be heated from both the mold surface and the back face of an article that is being molded. The hot air is preferably maintained above 300° C. The conditions are controlled so as not to cause the thermal oxidation and deterioration of the back face of an article being molded.

The hot air process is effective for powder slush molding multiple layers i.e. two or three. More specifically, a first powder can be slush molded as the outermost layer in a heated mold, whereupon a second powder can be adhered to the first powder in a semi-melted state. Thereafter a third powder is slush molded. The resulting layers are then heated and melted. In this process, heat transmission may be insufficient when the mold is heated only from the mold face. Therefore, the hot-air furnace process is preferable.

The complex skin 16 formed in the above process is adhered to one mold so that the outer layer 20 can contact the mold face. The core layer 22, which may be a synthetic resin such as polypropylene, ABS, or polystyrene, is arranged in another mold. The foam layer 24, which may be a raw foam material such as polyurethane, is placed between the molds to adhere to the complex skin 16 and the core layer 22 to produce a molded article 10.

Powder used to make a complex skin 16, according to the invention, may maintain good flexibility. The complex skin 16 may be adhered effectively to a foam layer due at least in part to a blocking of bleeding of oligomer components, process oil, stabilizers, and catalysts in the inner layer even after the complex skin 16 and articles made therefrom are left standing alone, for significant periods.

Specific inventive examples, and the properties thereof, will now be described in relation to comparative examples.

INVENTIVE EXAMPLES 1–5 AND
COMPARATIVE EXAMPLES 1 AND 2

Outer layers were made as shown for inventive examples 1 comparative example 1 in Table 1, and for inventive examples 3–5 and comparative example 2 in Table 2.

TABLE 1

| | (Parts by weight) | | | | | |
| --- | --- | --- | --- | --- | --- | --- |
| | Inventive Example 1 | | Inventive Example 2 | | Comparative Example 1 | |
| | outer layer | inner layer | outer layer | inner layer | outer layer | inner layer |
| PP resin | 40 | 35 | 40 | 35 | 40 | 35 |
| OH-modified PP resin *1 | — | 5 | — | — | — | 5 |
| COOH-modified PP resin *2 | — | — | — | 5 | — | — |
| H-SBR | (25) | (27) | (25) | (27) | (25) | (27) |
| POE | 19 | 19 | 19 | 19 | 19 | 19 |
| Process oil | 10 + (6) | 10 + (4) | 10 + (6) | 10 + (4) | 10 + (6) | 10 + (4) |
| Dibutyltin dilaurate | — | (0.3) | — | (0.3) | — | — |
| Silicone oil MB | 1 | — | 1 | — | 1 | — |
| Ca stearate | 0.3 | 0.3 | 0.3 | 0.3 | 0.3 | 0.3 |
| Phenolic antioxidant | (0.2) | (0.1) | (0.2) | (0.1) | (0.2) | (0.1) |
| Phosphate-series antioxidant | (0.2) | (0.1) | (0.2) | (0.1) | (0.2) | (0.1) |
| Perhexa 25B-40 | 0.3 | 0.3 | 0.3 | 0.3 | 0.3 | 0.3 |
| Peel strength (N/25 mm) | 4.3 | | 3.8 | | 2.3 | |

TABLE 1-continued (Parts by weight)

| | Inventive Example 1 | | Inventive Example 2 | | Comparative Example 1 | |
|---|---|---|---|---|---|---|
| | outer layer | inner layer | outer layer | inner layer | outer layer | inner layer |
| Peel state | ○ | | Δ | | X | |
| Releasability from mold | ○ | | ○ | | ○ | |
| MFR (g/10 min) | 170 | | 130 | | 160 | |

*1: YUMEX 1210 manufactured by Sanyo Chemicals Ind., Co., Ltd.
*2: YUMEX 1001 manufactured by Sanyo Chemicals Ind., Co., Ltd.

TABLE 2

(Parts by Weight)

| | Inventive Example 3 | | Inventive Example 4 | | Inventive Example 5 | | Comparative Example 2 | |
|---|---|---|---|---|---|---|---|---|
| | outer layer | inner layer | outer layer | inner layer | inner layer | inner layer | outer layer | inner layer |
| PP resin | 40 | 40 | 40 | 40 | 40 | 40 | 40 | 40 |
| OH-modified PP resin *1 | | 4 | | 4 | | 4 | | 4 |
| H-SBR | (25) | (24) | (25) | (24) | (25) | (24) | (25) | (24) |
| POE | 19 | 24 | 19 | 24 | 19 | 24 | 19 | 24 |
| Process oil | 10 + (6) | 4 + (4) | 10 + (6) | 4 + (4) | 10 + (6) | 4 + (4) | 10 + (6) | 4 + (4) |
| Dibutyltin dilaurate | | 0.3 | | 0.3 | | 0.3 | | 0.3 |
| Silicone oil MB | 1 | 0.1 | 1 | 0.3 | 1 | 0.5 | 1 | |
| Ca stearate | 0.3 | | 0.3 | | 0.3 | | 0.3 | |
| Phenolic antioxidant | (0.3) | (0.3) | (0.3) | (0.3) | (0.3) | (0.3) | (0.3) | (0.3) |
| Phosphite-series antioxidant | (0.2) | (0.2) | (0.2) | (0.2) | (0.2) | (0.2) | (0.2) | (0.2) |
| Perhexa 25B-40 | 0.3 | 0.3 | 0.3 | 0.3 | 0.3 | 0.3 | 0.3 | 0.3 |
| Releasability from mold | ○ | | ○ | | ○ | | ○ | |
| MFR (g/10 min) | 127 | 109 | 127 | 112 | 127 | 115 | 127 | 107 |
| Angle of repose *2 | 39 | 39–46 | 39 | 39 | 39 | 39 | 39 | 39-not measurable |
| State after 20-sheet molding | | slight blocking | | good | | good | | blocking |
| Days passed | 0 | 10 | 0 | 10 | 0 | 10 | 0 | 10 |
| Peel State | 90% | 60% | 100% | 100% | 90% | 90% | 100% | 20% |
| Peel Strength | ○ | ○ | ⊙ | ⊙ | ⊙ | ○ | ○ | X |

*1: Polytail H manufactured by Mitsubishi Chemical Co., Ltd.
*2: arrow expresses change of angle of repose after molding For each, a polypropylene resin (PP resin), an elastomer with high oil absorption capability (POE), an inner release agent, stearate Ca, and an organic peroxide were dry blended together through a tumbler. While feeding the resulting blend from a feed hopper of a twin extruder (PCM45 manufactured by Ikegai Steel Industries) and pouring in a process oil from a vent opening, the mixture was kneaded together with a cylinder temperature of 210° C. and a screw rotation of 300 rpm. H-SBR, a process oil, a phenolic antioxidant, and a phosphite-series oxidant were dry blended together. While concurrently feeding in the resulting blend from the raw material feed hopper of a similar twin extruder and pouring a process oil from a vent opening, the mixture was kneaded together under the same conditions and was then extruded and pelletized. In the tables, figures in parenthesis represent the amount in parts by weight of the material added the second time.

By charging and grinding the pellet immersed in liquid nitrogen in a turbo mill T2504J (manufactured by Turbo Industry, Co.), particles passing through a 1000 μm sieve were collected.

Under the conditions as described above for the outer layers, powders were kneaded twice by means of a twin extruder, extruded and pelletized for the outer layers. The resulting pellet was immersed in liquid nitrogen and charged in a turbo mill T2504J (manufactured by Turbo Industry, Co.) for grinding. Powders capable of passing through a 1,000 μm sieve were used in the inner layers. The numerical figures in parenthesis represent the amount in parts by weight of the material added the second time.

The powders for the outer layers were slush molded. An outer layer having a thickness of 0.6 mm was molded by a slush molding process. A plate having a dimension of 150 mm×150 mm×3 mm with a crimp skin pattern was heated in an oven to 250° C. About 800 g of the outer layer powder were placed thereon for about 10 seconds to allow the powder to adhere to the plate. The powder which did not melt and adhere was removed. The resulting plate was heated in an oven at 300° C. for 60 seconds.

To the outer layer, approximately 800 g of an inner layer powder were applied for 10 seconds to form a layer of approximately 0.2 mm in thickness. The layer was melted in an oven at 300° C. for about 60 seconds and then removed from the oven. The resulting layer was then cooled in water to facilitate separation from the mold, with the resulting skin having a thickness of approximately 0.8 mm.

The surface of the outer layer was sprayed with a surface treating agent manufactured by Dainiti Fine Chemical, Co., Ltd. identified as Leatheroid LU-775SP. Subsequently, a transparent, urethane-series coating was sprayed on. This product was Leatheroid LU-2408 coating. The outer layer was dry heated in an oven at 80° C. for 30 minutes.

The resulting skin was evaluated for adhesive properties as follows. An iron plate having a dimension of 340 mm×200 mm×12 mm and with a recess of 300 mm×200 mm×8 mm was used as a mold and heated in an oven at 40° C. The skin was placed on the bottom of the recess. Thereafter, approximately 100 g of a blended raw material of a semi-rigid urethane foam was poured thereon. The recess was thereafter immediately sealed with an aluminum plate, with the resulting assembly heated in an oven at 40° C. for 4 minutes to produce a laminate of the skin and the urethane foam. A piece having a 25 mm width and 150 mm length was cut from the laminate for use in evaluation.

At a tensile rate of 200 mm/sec, the 180° C. peel strength and peel state between the skin and the urethane foam were examined. The peel strength above 5 N/35 mm is expressed with a "◎" in the tables. The peel strength between 1 to 5 N/25 mm is expressed with an "○". The peel strength below 1 N/25 mm is expressed with the symbol "×".

agent was added, maintained good adhesion with the urethane foam and the peel strength and peel state thereof against the urethane foam were maintained even after days passed. As to the powdery property, the powder on the side of the inner layer to which the silicone oil-series inner release agent was added retained the powder fluidity.

INVENTIVE EXAMPLES 6–8 AND COMPARATIVE EXAMPLES 3 AND 4

The outer layer blends are shown in Table 3, below.

TABLE 3

(parts by weight)

|  | Inventive Example | | | | Comparative Example | |
|---|---|---|---|---|---|---|
|  |  | 6 | 7 | 8 | 3 | 4 |
|  | outer layer | inner layer | inner layer | inner layer | outer layer | inner layer |
| PP resin | 40 | — | — | — | — | — |
| OH-modified PP resin *1 | — | — | — | — | — | — |
| COOH-modified PP resin *2 | — | — | — | — | — | — |
| H-SBR | (25) | — | — | — | — | — |
| POE | 19 | 100 | 100 | — | 100 | — |
| EPR | — | — | — | 50 | — | 100 |
| OH terminal hydrogenated polybutadiene *3 | — | 5 | — | 5 | 5 | 5 |
| OH terminal 1,2-hydrogenated polybutadiene *4 | — | — | 5 | — | — | — |
| Process Oil | 10 + (6) | — | — | 40 | — | — |
| Dibutyltin dilaurate | — | 0.3 | 0.3 | 0.3 | — | — |
| Silicone oil MB | 1 | — | — | — | 1 | — |
| Ca stearate | 0.3 | 0.3 | 0.3 | 0.3 | 0.3 | 0.3 |
| Phenolic antioxidant | (0.2) | 0.1 | 0.1 | 0.1 | 0.1 | 0.1 |
| Phosphite-series antioxidant | (0.2) | 0.1 | 0.1 | 0.1 | 0.1 | 0.1 |
| Perhexa 25B-40 | 0.3 | — | — | — | — | — |
| Peel strength (N/25 mm) |  | 4.4 | 3.5 | 3.5 | 2.0 | 1.0< |
| Peel State |  | ○ | Δ | Δ | X | X |
| Releasability from mold |  | ○ | ○ | ○ | ○ | ○ |
| MFR (g/10 min) |  | 110 | 120 | 110 | 110 | 3 |

*1: YUMEX 1210 manufactured by Sanyo Chemicals Ind., Co., Ltd.
*2: YUMEX 1001 manufactured by Sanyo Chemicals Ind., Co., Ltd.
*3: Polytail H manufactured by Mitsubishi Chemical Co., Ltd.
*4: Ply-bd R-45M manufactured by 8:49 AMIdemitsu Petroleum Chemical Industry, Co.

The peel state is expressed as follows. The cohesive failure of the overall urethane foam is marked with 100%. The cohesive failure of a part thereof is expressed with the percentage (%) of the part. The interfacial failure of the whole structure is designated as interfacial peel.

The evaluation test of the adhesive quality using such skin was carried out over time after the surface coating treatment.

For melt viscosity, melt flow rate was measured at 230° C. under a load of 2.16 kgf according to JIS K7210. These results are shown in Table 1 for inventive examples 1 and 2 and comparative example 1 and in Table 2 for inventive examples 3–5 and comparative example 2.

By using a powder tester (manufactured by Hosokawa Micron Co.), the test of the powdery property was conducted by measuring the angles of repose for a powder composition with an agent modifying the powdery property added thereto and a powdery composition after molding of 20 sheets or more.

As seen for the inventive examples, the releasability of the skin from the mold is high and the peel strength of the inner layer of the skin from the urethane foam is likewise high.

Even after annealing of the coating-treated surface, the inner layer to which the silicone oil-series inner release In each case, the blends were kneaded together under the same conditions as described for inventive examples 1–5 and were then extruded and pelletized. By subsequently grinding the pellet immersed in liquid nitrogen in a turbo mill T250-4J (manufactured by Turbo Industries, Co.), particles passing through a 1000 μm sieve were collected.

For the inner layers, the blends in Table 3 were kneaded once by a twin extruder under the same conditions as for the outer layers and were then extruded and thereafter pelletized. By subsequently grinding the pellet immersed in liquid nitrogen in a turbo mill T250-4J (manufactured by Turbo Industries, Co.), the powders were collected that passed through a 1000 μmm sieve.

The powders for the outer layers were then used for slush molding. Under the same conditions as used in inventive examples 1–5, the slush molding process was carried out to produce an outer layer having a thickness of 0.6 mm. On the outer layer, approximately 800 g of an inner layer powder were applied for approximately 10 seconds to form a layer having a thickness of 0.2 mm. The layer was thereafter melted in an oven at 300° C. for about 60 seconds. The layer was then removed from the oven, cooled in water, and removed from the mold to produce a skin having a thickness of approximately 0.8 mm.

The releasability of the skin from the mold was visually assessed and designated as being either good (○) or poor ("×").

The evaluation of adhesive properties was determined as follows. An iron plate having a dimension of 340 mm×200 mm×12 mm and with a recess of 300 mm×200 mm×8 mm was used as a mold and heated in an oven at 40° C. The skin was placed at the bottom of the recess. Approximately 100 g of a blended raw material of a semi-rigid urethane foam were then poured thereon. The recess was thereafter immediately sealed with an aluminum plate with the resulting sub-assembly heated in an oven at 40° C. for 4 minutes to produce a laminate consisting of the skin and the urethane foam. A piece having a 25 mm width and 150 mm length was cut from this laminate and used for evaluation.

At a tensile rate of 200 mm/sec, the 180° C. peel strength and peel state between the skin and the urethane foam layer were examined. The peel strength above 5 N/25 mm is expressed with a double circle (◎). The peel strength between 1–5 N/25 mm is expressed with an open circle (○). The peel strength below 1 N/25 mm is expressed with an "×".

The peel strength is identified as follows. The cohesive failure of the overall urethane foam is identified with an open circle (○). The cohesive failure of a part thereof is expressed with an open triangle (△). The interfacial failure of the whole structure is expressed with symbol "×".

The melt viscosity was measured as melt flow rate at 230° C. under a load of 2.16 kgf according to JIS K7210.

These results are shown in Table 3. The inventive examples show that the releasability from the skin from the mold is very good and the peel strength of the inner layer of the skin from the urethane is high.

The foregoing disclosure of specific embodiments is intended to be illustrative of the broad concepts comprehended by the invention.

What is claimed is:

1. A multilayer skin comprising:
    an outer layer prepared by slush molding powder of a thermoplastic elastomer composition comprising a polypropylene resin, a hydrogenated styrene-butadiene random copolymer rubber, a process oil, an elastomer capable of absorbing said process oil, and a release agent; and
    an inner layer bonded to the outer layer, prepared by slush molding, and comprising a blend of an elastomer capable of absorbing said process oil, an olefinic polymer with active hydrogen, and a catalyst which promotes isocyanate reaction,
    wherein the outer layer has a thickness of 0.3 to 1.0 mm and the inner layer has a thickness of 0.1 to 0.5 mm.

2. The multilayer skin according to claim 1 wherein the elastomer capable of absorbing said process oil in at least one of the inner and outer layers comprises an ethylene-octene copolymer.

3. The multilayer skin according to claim 1 wherein the inner layer is prepared by slush molding with the inner layer applied to the outer layer.

4. A multilayer skin comprising:
    an outer layer prepared by slush molding the powder of a thermoplastic elastomer composition comprising a polypropylene resin, a hydrogenated styrene-butadiene random copolymer rubber, a process oil, an elastomer capable of absorbing said process oil, and a release agent; and
    an inner layer prepared by slush molding first and second powders,
    the first powder comprising a thermoplastic elastomer composition comprising a polypropylene resin, a hydrogenated styrene-butadiene random copolymer rubber, a process oil, and an elastomer capable of absorbing said process oil,
    the second powder comprising an elastomer capable of absorbing said process oil, an olefinic polymer with active hydrogen, and a catalyst promoting isocyanate reaction,
    wherein the outer layer has a thickness of 0.3 to 1.00 mm and the inner layer has a thickness of 0.3 to 1.0 mm.

5. The multilayer skin according to claim 4 wherein the inner layer is prepared by slush molding with the inner layer applied to the outer layer.

6. The multilayer skin according to claim 4 wherein the elastomer capable of absorbing said process oil in at least one of the inner and outer layers comprises an ethylene-octene copolymer.

7. The multilayer skin according to claim 4 wherein the weight ratio of the first powder to the second powder is 1:5 to 5:1.

8. The multilayer skin according to claim 7 wherein the elastomer capable of absorbing said process oil in at least one of the inner and outer layers comprises an ethylene-octene copolymer.

9. A multilayer skin comprising inner and outer layers each prepared by slush molding powder,
    wherein the powder in the outer layer comprises a thermoplastic composition comprising a polypropylene resin, a hydrogenated styrene-butadiene random copolymer rubber, a process oil, an elastomer, capable of absorbing said process oil, and a release agent,
    wherein the powder in the inner layer comprises a polypropylene resin, a hydrogenated styrene-butadiene random copolymer rubber, a process oil, an elastomer capable of absorbing said process oil, an olefinic polymer with active hydrogen, and a catalyst promoting isocyanate reaction,
    wherein the outer layer has a thickness of 0.3 to 1.0 mm and the inner layer has a thickness of 0.1 to 0.5 mm.

10. The multilayer skin according to claim 9 wherein the inner layer is prepared by slush molding with the inner layer applied to the outer layer.

11. The multilayer skin according to claim 9 wherein the elastomer capable of absorbing said process oil in the inner and outer layers comprises an ethylene-octene copolymer.

12. The multilayer skin according to claim 9 wherein the outer layer has a surface and a coating film is formed on the surface of the outer layer.

13. The multilayer skin according to claim 12 wherein the elastomer capable of absorbing said process oil in the inner and outer layers comprises an ethylene-octene copolymer.

14. The multilayer skin according to claim 9 wherein the inner layer comprises a release agent.

15. The multilayer skin according to claim 14 wherein the outer layer has a surface and a coating film is formed on the surface of the outer layer.

16. The multilayer skin according to claim 14 wherein the elastomer capable of absorbing said process oil in the inner and outer layers comprises an ethylene-octene copolymer.

17. A multilayer skin comprising inner and outer layers each prepared by slush molding powder,
    wherein the powder in the, outer layer comprises a thermoplastic composition comprising a polypropylene resin, a hydrogenated styrene-butadiene random copolymer rubber, a process oil, an elastomer capable of absorbing said process oil, and a release agent, wherein the inner layer is prepared by slush molding first and second powders, the first powder comprising a thermoplastic elastomer composition comprising a polypropylene resin, a hydrogenated styrene-butadiene random copolymer rubber, a process oil, and an elastomer capable of absorbing said process oil, the second powder comprising a thermoplastic composition comprising a polypropylene resin, a hydrogenated styrene-butadiene random copolymer rubber, a process oil, an elastomer capable of absorbing said process oil, an olefinic polymer with active hydrogen, and a catalyst promoting isocyanate reaction, wherein the outer layer has a: thickness of 0.3 to 1.0 mm and the inner layer has a thickness of 0.1 to 0.5 mm.

18. The multilayer skin according to claim 17 wherein the inner layer is prepared by slush molding with the inner layer applied to the outer layer.

19. The multilayer skin according to claim 17 wherein the elastomer capable of absorbing said process oil in the inner and outer layers comprises an ethylene-octene copolymer.

20. The multilayer skin according to claim 17 wherein the outer layer has a surface, and a coating layer is formed on the surface of the outer layer.

21. The multilayer skin according to claim 20 wherein the elastomer capable of absorbing said process oil in the inner and outer layers comprises an ethylene-octene copolymer.

22. The multilayer skin according to claim 17 wherein the weight ratio of the first powder to the second powder is 1:5 to 5:1.

23. The multilayer skin according to claim 22 wherein the elastomer capable absorbing said process oil in the inner and outer layers comprises an ethylene-octene copolymer.

24. The multilayer skin according to claim 22 wherein the outer layer has a surface, and a coating layer is formed on the surface of the outer layer.

25. The multilayer skin according to claim 24 wherein the elastomer capable of absorbing said process oil in the inner and outer layers comprises an ethylene-octene copolymer.

26. A multilayer skin according to claim 17 wherein the inner layer comprises a release agent.

27. The multilayer skin according to claim 26 wherein the elastomer capable of absorbing said process oil in the inner and outer layers comprises an ethylene-octene copolymer.

28. The multilayer skin according to claim 26 wherein the outer layer has a surface, and a coating layer is formed on the surface of the outer layer.

29. The multilayer skin according to claim 28 wherein the elastomer capable of absorbing said process oil in the inner and outer layers comprises an ethylene-octene copolymer.

30. The multilayer skin according to claim 26 wherein the weight ratio of the first powder to the second powder is 1:5 to 5:1.

31. The multilayer skin according to claim 30 wherein the elastomer capable of absorbing said process oil in the inner and outer layers comprises an ethylene-octene copolymer.

32. The multilayer skin according to claim 30 wherein the outer layer has a surface, and a coating layer is formed on the surface of the outer layer.

33. The multilayer skin according to claim 32 wherein the elastomer capable of absorbing said process oil in the inner and outer layers comprises an ethylene-octene copolymer.

* * * * *